United States Patent [19]

Nakamura et al.

[11] 4,399,161

[45] Aug. 16, 1983

[54] NOVEL METHOD OF STORING PROCESSED FISH AND ROE

[75] Inventors: Hisao Nakamura, Tokyo; Youji Uchida, Asaka, both of Japan

[73] Assignee: Mitsubishi Gas Chemical Company, Inc., Tokyo, Japan

[21] Appl. No.: 234,434

[22] Filed: Feb. 13, 1981

[30] Foreign Application Priority Data

Feb. 15, 1980 [JP] Japan ................................. 55-17246
Feb. 20, 1980 [JP] Japan ................................. 55-19888
Feb. 21, 1980 [JP] Japan ................................. 55-20886

[51] Int. Cl.³ .......................... A23B 4/00; A22C 25/00
[52] U.S. Cl. .................................... 426/541; 426/643; 426/418
[58] Field of Search ............... 426/133, 418, 541, 232, 426/643

[56] References Cited

U.S. PATENT DOCUMENTS

| | | | |
|---|---|---|---|
| 2,485,566 | 10/1949 | Clark | 426/232 X |
| 2,825,651 | 3/1958 | Loo et al. | 426/541 |
| 2,987,404 | 6/1961 | Beckman | 426/418 |
| 3,169,068 | 2/1965 | Bloch | 426/541 |
| 3,206,317 | 9/1965 | Golber | 426/232 X |
| 4,041,209 | 8/1977 | Scholle | 426/133 X |
| 4,048,361 | 9/1977 | Valyi | 426/133 X |
| 4,107,362 | 8/1978 | Valyi | 426/133 X |
| 4,113,652 | 9/1978 | Yoshikawa et al. | 426/418 X |
| 4,230,595 | 10/1980 | Yamaji et al. | 426/541 X |
| 4,299,719 | 11/1981 | Aoki et al. | 426/541 X |

FOREIGN PATENT DOCUMENTS 54-154542 12/1979 Japan .................................. 426/541
55-109444 8/1980 Japan .................................. 426/541

OTHER PUBLICATIONS

Watt, B. K. et al., Composition of Foods, Agriculture Handbook No. 8, U.S. Dept. Agr., 1963, pp. 33, 34.
Komarik, S. L. et al., Food Products Formulary, vol. 1, The Avi. Publ. Co., Inc., 1974, pp. 298, 299.

Primary Examiner—Robert A. Yoncoskie
Attorney, Agent, or Firm—Fleit, Jacobson & Cohn

[57] ABSTRACT

A method of storing processed fish and processed roe which comprises placing processed fish or processed roe in a gas impermeable packing bag or an airtight container together with an oxygen absorbent and leaving the same to stand at a temperature between $-20°$ and $25°$ C. is disclosed. This invention permits storage processed fish or processed roe containing little salt, or processed fish or processed roe containing much water.

12 Claims, No Drawings

NOVEL METHOD OF STORING PROCESSED FISH AND ROE

BACKGROUND OF THE INVENTION

This invention relates to a novel method of storing processed fish and roe.

Containing much water, fish and roe deteriorate very quickly, so they must be kept fresh until they reach the final outlets of the distribution market. Known methods of fish or roe storage include refrigeration, freezing, drying, salting, etc. But each method has its own defects and is not completely satisfactory. In one method, salted fish is dried whole or open. But salted products are generally stored at a temperature lower than −20° C., so it becomes less tasteful due to protein denaturation or loss of freshness. In addition, they are contacted by air during storage and their quality is easily reduced by oxidation of fat. An attempt was made to prevent putrefaction with an preservative or to prevent lipid denaturation with an antioxidant, but the result was far from being satisfactory and it was impossible to keep salted and dried fish fresh and tasteful over an extended period of time. Addition of chemicals to prevent food deterioration is not a good method in view of food sanitation, and such method is not desirably taken in the future.

Freezing is an effective method to store fish, but once frozen, fish does not return to the original state even when it is thawed, and instead, its tissues decolor and soften, and due to the attack of microorganisms, it is easily deteriorated or putrefied. For instance, eel is frozen for storage after it is grilled without dipping in sauce, but teriyaki having adequate flesh thickness cannot be made of the eel stored by this method, and because of the loss of lipid, the tissues become very loose. This is because fish protein is denatured upon extended storage in a frozen state.

Vacuum packaging is another effective method for storing processed fish, but one of its defects is that air unavoidably enters the pack during storage. Teriyaki of eel is sometimes sold vacuum packed, but for one thing, this method requires expensive equipment and high maintenance cost, and for another, due to creation of vacuum in the pack, the product does not have the flesh thickness required for a good teriyaki. What is more, the quality of the packed product is reduced and the teste of teriyaki served hot is lost.

SUMMARY OF THE INVENTION

Therefore, this invention relates to a novel method of storing fish and roe that is free from the defects of the conventional methods. According to this invention, a method for storing fish and roe which comprises placing processed fish or processed roe in a gas impermeable packaging bag or an airtight container together with an oxygen absorbent and leaving the same to stand at a temperature between −20° and 25° C.

DETAILED DESCRIPTION OF THE INVENTION

The oxygen absorbent as used in the specification and the claims is a reducing composition packed in a gas permeable bag, at least part of a material constituting the bag is a material having Gurley gas permeability of 1,000 to 100,000 sec/100 ml air. The Gurley gas permeability is determined in terms of the time require for a given amount of air to pass through a film 1 inch square in accordance with JIS P 8117. The oxygen absorbent, when packed together with an article to be stored, removes or absorbs the oxygen present in the atmosphere in the pack to a level lower than a predetermined level. A bag in which one side material of the bag is a material having a Gurley gas permeability of 1,000–100,000 sec/100 ml air, the other side material of the bag being a gas impermeable material may be used.

The reducing composition is a solid substance which absorbs oxygen it contains as a main active component a reducing agent selected from the group consisting of metallic iron or iron carbide in the form of powder, chips or particles; reducing inorganic salts such as dithionite, sulfite or ferric salt; polyphenols such as hydroquinone, catechol, pyrogalol, gallic acid, butylhydroxyanisole; reducing sugars such as glucose, and polyhydric alcohols such as ascorbic acid or erythorbic acid. Those which contain iron powder as a main active component, for example, those which contain iron powder and an electrolyte such as a metal halide are preferred. A material constituting a gas permeable bag may be a laminate of a foraminous plastic film with a gas permeable sheet selected from paper, cloth, nonwoven fabric or a lamination thereof; a microporous film; and a lamination of a microporous film with a gas permeable sheet having a softening point that differs from that of the microporous film. A microporous film is used with advantage for preventing contact between moisture in the processed fish-packing system and the reducing composition.

Examples of the processed fish to be stored by the method of this invention are (1) dried fish, (2) fish removed of the internal organs, followed by sprinkling of the inside with salt, and optional rubbing of the outside with salt, (3) fish removed of the internal organs, followed by immersion in brine, and (4) fish removed of the internal organs and left undried. Preparation of dried fish includes the following: (a) drying fish from which the internal organs and other unnecessary parts are removed; (b) drying boiled fish; (c) immersing fish in brine, followed by draining and drying (it may be immersed immediately or after being dried whole, split in the back or belly, or sliced); (d) drying fish by grill; and (e) beheading and removing the internal organs from fish, splitting into two pieces, cutting them into chops, boiling the chops, cooling, boning, roasting, trimming, and drying.

Fish prepared by the method (a) may be stored at −20° C. to 20° C. when it contains 15 to 25% water, and at between −20° and 10° C., preferably between −3±0.5° C., when it contains 50 to 70% water. At −3±0.5° C., the formation of ice crystals in the cell starts, and this is a condition more hostile to microorganism cells than when fish is completely frozen. In addition, no protein or lipid denaturation occurs at that temperature. Therefore, fish can be stored effectively for an extended period at that temperature.

Fishes that can be processed by the method (a) include dried cuttlefish, dried cod and dried flesh of herring.

Fish prepared by the method (b) may be stored at −20° C. to 20° C. when it contains 10 to 25% water, and at between −20° and 10° C., preferably at −3±0.5° C. when it contains 40 to 80% water. Fishes that can be processed by the method (b) include dried small sardines, dried young sardines, dried sand eels, and dried shrimps.

Fish prepared by the method (c) may be dried to a water content of 40 to 80%, preferably 65 to 75%. The brine in which it has been immersed preferably has a NaCl content of 10 to 30%. The final product preferably has a low NaCl content, particularly preferably a NaCl content in the range of from 2 to 10%. The product may be stored at a temperature between −20° and 10° C. For short storage, a temperature between 0° and 10° C. is generally selected, and for extended storage, a temperature of −3±0.5° C. is preferred. All kinds of fish that are usually salted and dried for storage can be processed by the method (c), such as flying fish, horse mackerel, sardine, mackerel, walleye pollack, flatfish, Atka mackerel, saury-pike, sandfish, herring, cod, mackerel pike, and cuttlefish.

Fishes processed by the method (d) include flatfish, siltaginoid and pond fish, and the product may be stored at between −10° and 20° C.

Fishes processed by the method (e) include bonito and mackerel. The product is stored at between 10° and 20° C.

Fishes to be processed by the method (2) or (3) include salmon, trout, cod, herring, Atka mackerel, anchovy, and whale, and they are stored at between −10° and 20° C., preferably at −3±0.5° C.

Fishes processed by the method (4) are stored at between −20° and 10° C., preferably at −3±0.5° C.

Eel may be stored after grilled in split pieces (on spit, if desired) without being dipped sauce. The storage temperature may be in the range of from −20° to 10° C., preferably at −3±0.5° C. Specially, eel is split in the back or belly, pierced with a bamboo spit if desired, and grilled with charcoal, gas or electricity. Eel may be stored in the form of teriyaki which is prepared by grilling split pieces first without sauce, then with sauce. The storage temperature is between 0° and 20° C., preferably between 0° and 5° C.

Roe may be stored after following treatments are effected:

(a) Roe is washed with brine and dried, or
(b) Roe is washed with brine, followed by rubbing its outside surface with salt.

Roe may be also stored at a temperature between −10° and 15° C., preferably at −3±0.5° C.

Example of roe being capable of being stored by treatment (a) is herring roe. Examples of roes being capable of being stored by treatment (b) include cod roe, mullet roe, caviar, and salmon roe.

The processed fish or processed roe and an oxygen adsorbent are placed in a gas impermeable packing bag or airtight container for storage. The gas impermeable packing bag is generally made of a material which has an oxygen permeability of less than 50 ml/m$^2$ atom.d. Advantageous examples are Polyvinylidene chloride film, or a film coated or laminated with polyvinylidene chloride. A biaxially oriented film or a lamination of biaxially oriented films is preferred because of high strength. The gas impermeable packing bag is generally provided with a hermetic enclosure by heat sealing, and other closing devices may be employed. The airtight container may be composed of a tray made of formable and heat-sealable plastic and a closure made of a gas impermeable film or sheet that is heat-sealed to the tray, or the container may be in the form of a plastic or metal can. The airtight container and the gas impermeable packing bag may have a separate section for receiving the oxygen absorbent in such a manner that it is not in contact with the processed fish or processed roe. For storage in the gas impermeable packing bag or airtight container, the processed fish or processed roe is may be put in a tray which is kept out of contact with the oxygen absorbent, or processed fish or processed roe packed in a gas permeable bag may be packed in a gas impermeable bag with an oxygen absorbent, or a substance that adsorbs a drip from the fish or roe may be also placed in the bag or container, or a thick film may be placed on the fish to prevent the formation of a pin hole due to a tiny sharp fish bone.

The objects of this invention can be achieved by placing the processed fish or processed roe in a hermetic enclosure together with the oxygen absorbent, and an oxygen indicator is preferably placed in the enclosure for maintaining the hermeticity of the enclosure and for confirming the performance of the oxygen adsorbent. For these purposes, a solid oxygen indicator in a gas permeable packing bag or a perforated gas impermeable packing bag is put in the hermetic enclosure, or a printable indicator is printed on the surface of an oxygen adsorbent packing bag and placed in a transparent hermetic container, or a indicator is printed on the inner surface of a transparent hermetic container.

According to this invention, the processed fish or processed roe placed in a hermetic enclosure together with an oxygen absorbent is stored at a predetermined temperature. It is stored in a storage chamber, particularly a storage chamber that permits temperature control. A transportable container is preferably used for the sake of convenience in distribution on the market.

This invention provides a method for storing processed fishes or processed roe over an extended period of time without deteriorating protein or lipid. This advantage of the invention is particularly conspicuous in storage of salted/dried products or boiled/dried products. Therefore, this invention offers to the consumer tasteful processed fishes or processed roe that have been impossible to produce by the conventional method. As a particular advantage, this invention permits storage of products containing little salt or products containing much water that have been impossible to store by the conventional technique. Another great merit of this invention is that it is capable of storing teriyaki of eel, as well eel grilled unseasoned without impairing its appearance or quality.

This invention is now described in greater detail by reference to the following examples which are given here for illustrative purposes only and are by no means intended to limit the scope of the invention.

EXAMPLE 1

Fresh flying fish was washed with water, split on the back, immersed in 15% brine for 3 hours, drained, dried electrically for 4 hours to a water content of 70%, and all projecting bones were cut off with scissors. The dried fish was packed in a gas impermeable bag made of PVDC coated oriented nylon film (20μ) laminated with polyethylene (80μ), and an oxygen absorbent (commercially available from Mitsubishi Gas Chemical Company, Inc. as Ageless S-500) in which a reducing composition consisting of iron powder and metal halide is packed in a gas permeable material having Gurley gas permeability 4100 sec/100 ml air was also put within the gas impermeable packing bag. In the bag, the fish was placed in a plastic tray so that a drip would not contact the oxygen absorbent. An oxygen detector (Ageless Eye of Mitsubishi Gas Chemical Company, Inc.) was also put in the gas impermeable pack, which was heat sealed and stored in a refrigerator at $-3°$ C. Tables 1 to 4 show the time-dependent change in the number of microorganism cells and the quality of lipid and fish protein, as well as the result of organoleptic test.

COMPARATIVE EXAMPLE 1

The procedure of Example 1 was repeated except that the storage temperature was $8°$ C. The time-dependent change in the number of microorganism cells and the quality of lipid and fish protein, as well as the result of organoleptic test are also shown in Tables 1 to 4.

COMPARATIVE EXAMPLE 2

The procedure of Example 1 was repeated except that the processed flying fish was packed in a polyethylene bag and stored at $3°$ C. The time-dependent change in the number of microorganism cells and the quality of lipid and fish protein, as well as the result of organoleptic test are also shown in Tables 1 to 4.

TABLE 1

Change in number of microorganism cells (cells/g)

|  | fresh fish | brined fish | dried fish | after 14-day storage | after 40-day storage |
|---|---|---|---|---|---|
| Ex. 1 | $5.3 \times 10^3$ | $1.2 \times 10^4$ | $2.0 \times 10^4$ | $1.0 \times 10^2$ | $1.2 \times 10^2$ |
| Com. Ex. 1 | " | " | " | $8.2 \times 10^3$ | $2.0 \times 10^6$ |
| Com. Ex. 2 | " | " | " | $4.3 \times 10^5$ | $1.7 \times 10^8$ |

TABLE 2

Change in lipid content (TBA malonaldehyde mg/100 g)

|  | Fresh fish | dried fish | after 20-day storage | after 40-day storage | after 60-day storage |
|---|---|---|---|---|---|
| Ex. 1 | 0.04 | 0.04 | 0.04 | 0.04 | 0.04 |
| Com. Ex. 1 | " | " | 0.05 | 0.05 | 0.05 |
| Com. Ex. 2 | " | " | 0.25 | 0.47 | 0.62 |

TABLE 3

Change in fish protein content (denatured actomyosin/total actomyosin %)

|  | dried fish | after 15-day storage | after 40-day storage |
|---|---|---|---|
| Ex. 1 | 12 | 14 | 16 |
| Com. Ex. 1 | " | 15.5 | 17 |
| Com. Ex. 2 | " | 42 | 45 |

TABLE 4

Results of organoleptic test after 40-day storage

| Ex. 1 | no discoloration, with characteristic smell, tasteful |
|---|---|
| Com. Ex. 1 | characteristic smell discolored |
| Com. Ex. 2 | turned brown, with strong putrefactive smell in the gills |

EXAMPLE 2

Eel weighing 230 g was split in the back, pierced with a bamboo spit and grilled on a gas oven without being dipped in sauce. The grilled eel was packed in a gas impermeable bag made of a PVDC coated oriented nylon film ($20\mu$) laminated with polyethylene ($80\mu$). An oxygen absorbent was also put in the bag. In the bag, the eel was placed in a plastic tray so that it was not in contact with the oxygen adsorbent. An oxygen detector (Ageless Eye of Mitsubishi Gas Chemical Company, Inc.) was also put in the bag. The bag was then heat-sealed and stored in a refrigerator both at $-3°$ C. and $5°$ C. Tables 5 and 6 show the time-dependent change in $CO_2$ and $O_2$ levels in the bag, and the results of organoleptic test.

COMPARATIVE EXAMPLE 3

The procedure of Example 2 was repeated except that no oxygen absorbent was used and that the bag contained air. The time-dependent change in $CO_2$ and $O_2$ levels in the bag, and the result of organoleptic test are also shown in Tables 5 and 6.

TABLE 5

Change in $CO_2$ and $O_2$ levels in the bag

| storage temp. | sample | 6-days later $CO_2$ | 6-days later $O_2$ | 16-days later $CO_2$ | 16-days later $O_2$ | 60-days later $CO_2$ | 60-days later $O_2$ |
|---|---|---|---|---|---|---|---|
| $5°$ C. | Ex. 2 | 0.1 | 0.01 | 0.1 | 0.01 | | |
|  | Com. Ex. 3 | 3.0 | 15.6 | 13.5 | 0.01 | | |
| $-3°$ C. | Ex. 2 | 0.1 | 0.01 | 0.1 | 0.01 | 0.1 | 0.01 |
|  | Com. Ex. 3 | 0.4 | 20.4 | 0.6 | 19.8 | 14.5 | <0.1 |

TABLE 6

Results of organoleptic test

| storage temp. | sample | appearance | smell | taste of teriyaki | |
|---|---|---|---|---|---|
| $5°$ C. | Ex. 2 | O | normal | good | test after 16-days |
|  | Com. Ex. 3 | X | putrefactive | could not be tasted | |
| $-3°$ C. | Ex. 2 | O | normal | good | test after 60-days |
|  | Com. Ex. 3 | X | putrefactive | could not be tested | |

O good
X poor

The sample prepared in Example 2 did not evolve $CO_2$ gas, which was indicative of the deterioration of eel, even after it was stored for 16 days at $5°$ C. Its flesh thickness was adequate, and it tasted very good as teriyaki. The sample prepared in Comparative Example 3 evolved an increasing amount of $CO_2$ gas, causing $O_2$ consumption in the bag. The product stored for 16 days gave off a putrefactive smell and could not be tasted. The sample prepared in Example 2 that was stored for 60 days at $-3°$ C. was still tasteful, but the sample of Comparative Example 3 stored for the same period putrefied and could not be tested.

EXAMPLE 3

Eel weighing 200 g was split in the back, pierced with a bamboo spit and grilled on a gas oven. The grilled eel was dipped in sauce comprising soy, mirin (sweet sake for seasoning) and eel extract, etc. and grilled to make teriyaki. The eel was packed in a gas impermeable bag made of a PVDC coated oriented nylon film ($20\mu$) laminated with polyethylene ($80\mu$). The oxygen absorbent (Aglles S-500) was also put in the bag. In the bag, the eel was placed in a plastic try so that it was not in contact with the oxygen absorbent. An oxygen indicator as Ageless Eye from commercial available from Mitsubishi Gas Chemical Company, Inc.) was also put in the bag. After being sealed with an electric heat sealer, the bag was stored in a refrigerator at $5°$ C. Tables 7 and 8 show the time-dependent change in $CO_2$ and $O_2$ levels in the bag, and the result of organoleptic test.

COMPARATIVE EXAMPLE 4

The procedure of Example 3 was repeated except that no oxygen absorbent was used and that the bag contained air. The time-dependent change in $CO_2$ and $O_2$ levels in the bag, and the result or organoleptic test are shown in Tables 7 and 8.

COMPARATIVE EXAMPLE 5

The procedure of Example 3 was repeated except that no oxygen absorbent was used and that the bag was evacuated. The time-dependent change in $CO_2$ and $O_2$ levels in the bag, and the result of organoleptic test are shown in Tables 7 and 8.

TABLE 7

| | | Change in $CO_2$ and $O_2$ levels in the bag | | | |
|---|---|---|---|---|---|
| storage | | 6-days later | | 30-days later | |
| temp. | sample | $CO_2$ | $O_2$ | $CO_2$ | $O_2$ |
| 5° C. | Ex. 3 | 0.1 | 0.1 | 0.1 | 0.1 |
| | Com. Ex. 4 | 2.5 | 18.6 | 13.0 | 0.1 |
| | Com. Ex. 5 | 1.2 | 1.8 | 5.0 | 0.1 |

TABLE 8

| | | Result of organoleptic test on 30th day | | | |
|---|---|---|---|---|---|
| Storage temp. | sample | appearance | smell | flesh thickness | taste |
| 5° C. | Ex. 3 | normal | normal | O | 1 (good) |
| | Com. Ex. 4 | moldy, turned brown | putrefactive | Δ | 3 (could not be tasted) |
| | Com. Ex. 5 | turned brown | almost normal | X | 2 |

O large,
Δ medium
X small

The sample prepared in Example 3 did not evolve $CO_2$ gas indicative of the deterioration of eel, even after it was stored for 30 days. Its appearance was good, and it provided a delicious teriyaki when steamed and dipped in sauce. The sample prepared in Comparative Example 4 was moldy and could not be tasted after 30-day storage. The sample prepared in Comparative Example 5 did not have large flesh thickness, turned brown, and was insipid after 30-day storage.

EXAMPLE 4

Fresh anchovy was washed with water, drained, and boiled in 5% brine. The boiled fish was drained, allowed to cool, dried in the sun for 2 days to a water content of 15%. A hundred grams of the dried anchovy was packed in a gas impermeable bag made of PVDC coated oriented nylon film ($20\mu$) laminated with polyethylene ($80\mu$). An oxygen absorbent (Ageless Z-100 of Mitsubishi Gas Chemical Company, Inc.) and an oxygen detector (Ageless Eye of Mitusbishi Gas Chemical Company, Inc.) both wrapped in a gas permeable bag were also put in the bag. The bag was then heat-sealed and stored at 20° C. Tables 9 to 11 show the time-dependent change in $CO_2$ and $O_2$ levels and peroxide value in the bag, as well as the result of organoleptic test.

COMPARATIVE EXAMPLE 6

The procedure of Example 4 was repeated except that no oxygen absorbent was used and that the bag contained air. The time-dependent change in $CO_2$ and $O_2$ levels and peroxide value in the bag, as well as the result of organoleptic test are shown in Tables 9 to 11.

TABLE 9

| | Change in $CO_2$ and $O_2$ levels in the bag | | | | | |
|---|---|---|---|---|---|---|
| | 30-days later | | 60-days later | | 90-days later | |
| Sample | $CO_2$ | $O_2$ | $CO_2$ | $O_2$ | $CO_2$ | $O_2$ |
| Ex. 4 | 0.1 | 0.1 | 0.1 | 0.1 | 0.1 | 0.1 |
| Com. Ex. 6 | 2.1 | 7.9 | 2.8 | 3.1 | 3.5 | 1.4 |

TABLE 10

| | Change in peroxide value | | |
|---|---|---|---|
| Sample | 30-days later | 60-days later | 90-days later |
| Ex. 4 | 13.4 | 14.1 | 14.7 |
| Com. Ex. 6 | 25.7 | 43.7 | 105.3 |

TABLE 11

| | Result of organoleptic test | | |
|---|---|---|---|
| Sample | 30-days later | 60-days later | 90-days later |
| Ex. 4 | normal smell | normal smell | normal smell |
| Com. Ex. 6 | smell characteristic of oil oxidation | smell characteristic of oil oxidation | smell characteristic of oil oxidation |

The sample prepared in Example 4 did not evolve $CO_2$ gas indicative of the deterioration of dried fish even after storage for 90 days. The peroxide value increased little, and the smell characteristic of dried fish was maintained. The sample prepared in Comparative Example 6 gave off an increasing amount of $CO_2$, causing $O_2$ consumption in the bag. The product had an increased peroxide value, had a smell characteristic of oil oxidation, and was insipid.

EXAMPLE 5

Completely mature herring ovary was immersed in a tank of 3% brine and one or two replacements of brine were made daily until the ovary was fully bled. The ovary was then immersed in saturated brine for one month. The salted herring roe was recovered from the brine, fully washed with fresh water, and drained thoroughly. Ten bars of the roe each weighing 250 g were separately placed on foamed ABS resin plates ($14 \times 26 \times 1$ cm) and securely wrapped with a polyethylene film ($O_2$ permeability = 1,000–1,600 ml/m² atm.d.). The so wrapped roe was put in a gas impermeable KON/PE (15/70 m) measuring $200 \times 340$ mm which was heat sealed together with oxygen absorbent as Ageless S-300 commercially available from Mitsubishi Gas Chemical Company, Inc. and an oxygen indicator, Ageless Eye, and stored at 20° C. for a predetermined period of time. The time-dependent change in $CO_2$ and $O_2$ levels in the pack and that in the appearance of the packed roe were checked. An organoleptic test was also conducted to check the quality of the roe. The results are set forth in Tables 12 and 13.

TABLE 12

| | Change in $CO_2$ and $O_2$ levels in the pack | | | | | |
|---|---|---|---|---|---|---|
| day past | 7 | | 20 | | 30 | |
| gas | $CO_2$ | $O_2$ | $CO_2$ | $O_2$ | $CO_2$ | $O_2$ |
| Run 1 | 0.1 | 0.1 | 0.1 | 0.1 | 0.1 | 0.1 |

TABLE 13

| sample | test item | Change in the appearance of the roe and results of organoleptic test days past | | |
|---|---|---|---|---|
| | | 7 | 20 | 30 |
| Run | appearance | remained yellow | remained yellow | remained yellow |
| | taste | 3 | 3 | 3 |

Scale of taste:
3 good,
2 ordinary,
1 poor

The atmosphere in the pack containing Ageless remained substantially free of oxygen, and the roe in that pack satisfactorily kept the color before packing, evolved no carbon dioxide that was indicative of putrefaction, and tasted good.

What is claimed is:

1. A method of storing processed fish which comprises placing a fish in a gas impermeable packaging bag or an airtight container together with an oxygen absorbent and storing the same at a temperature between $-10°$ and $10°$ C., said processed fish having been obtained by immersing fresh fish in brine, splitting the back or belly, or slicing the fish, and then dewatering the fish, said processed fish having a water content of 40 to 80% and a NaCl concentration of 2 to 10%.

2. A method according to claim 1 wherein the oxygen absorbent is a reducing composition packed in a gas permeable bag, at least part of a material constituting the bag being composed of a material having a gas permeability of 1,000 to 100,000 sec/100 ml air.

3. A method according to claim 2 wherein the reducing composition contains as a main active component a reducing agent selected from the group consisting of iron powder, reducing inorganic salts, polyphenols, reducing sugars, reducing polyhydric alcohols and mixtures thereof.

4. A method according to claim 2 wherein the material having a gas permeability of 1,000 to 100,000 sec/100 ml air is a forminate plastic film laminated with a gas permeable sheet selected from paper, cloth, nonwoven fabric or a lamination of two or more thereof.

5. A method according to claim 2 wherein the material having gas permeability of 1,000 to 100,000 sec/100 ml air is a microporous film.

6. A method according to claim 2 wherein the material having a gas permeability of 1,000 to 100,000 sec/100 ml air is a microporous film laminated with a gas permeable sheet having a softening point that differs from that of the microporous film.

7. A method according to claim 1 wherein the fish is dehydrated to a water content of 65 to 75%.

8. A method according to claim 1 wherein the processed fish is stored at a temperature between $0°$ and $10°$ C.

9. A method according to claim 1 wherein the fish is stored at $-3\pm0.5°$ C.

10. A method according to claim 1 wherein the gas impermeable packaging bag is made of a plastic film having an oxygen permeability of less than 50 ml/m$^2$ atm.d.

11. A method according to claim 1 wherein the processed fish, the oxygen absorbent, and a solid oxygen indicator are placed in a transparent gas impermeable packing bag.

12. A method according to claim 1 wherein the processed fish is wrapped with a gas permeable material.

* * * * *